United States Patent
Shinomiya

(10) Patent No.: US 8,675,676 B2
(45) Date of Patent: *Mar. 18, 2014

(54) NETWORK SYSTEM

(75) Inventor: Hirotatsu Shinomiya, Sakai (JP)

(73) Assignee: Panasonic Corporation, Osaka (JP)

( * ) Notice: Subject to any disclaimer, the term of this patent is extended or adjusted under 35 U.S.C. 154(b) by 117 days.

This patent is subject to a terminal disclaimer.

(21) Appl. No.: 13/147,317

(22) PCT Filed: Feb. 2, 2010

(86) PCT No.: PCT/JP2010/051421
§ 371 (c)(1),
(2), (4) Date: Dec. 6, 2011

(87) PCT Pub. No.: WO2010/087495
PCT Pub. Date: Aug. 5, 2010

(65) Prior Publication Data
US 2012/0069852 A1    Mar. 22, 2012

(30) Foreign Application Priority Data

Feb. 2, 2009  (JP) .................................. 2009-021988

(51) Int. Cl.
*H04J 3/26* (2006.01)
(52) U.S. Cl.
USPC ........... 370/432; 709/238; 709/226; 455/41.2
(58) Field of Classification Search
USPC ......... 370/432, 338, 255, 353, 389, 447, 412; 709/238, 226
See application file for complete search history.

(56) References Cited

U.S. PATENT DOCUMENTS

2002/0110085 A1* 8/2002 Ho et al. ........................ 370/230
2004/0093421 A1* 5/2004 Peng et al. .................... 709/232

(Continued)

FOREIGN PATENT DOCUMENTS

| JP | 10-200538 A | 7/1998 |
| JP | 2003078532 A | 3/2003 |
| JP | 2006-060408 A | 3/2006 |

OTHER PUBLICATIONS

PCT/ISA/210 International Search Report for corresponding PCT/JP2010/051421 (dated Mar. 2, 2010).

Primary Examiner — Faruk Hamza
Assistant Examiner — Shah R Zaman
(74) Attorney, Agent, or Firm — Renner, Otto, Boisselle & Sklar, LLP

(57) ABSTRACT

The network system includes a controller (10) and a plurality of terminals (20). The controller (10) sends a first request signal (41) which indicates a first limited time period defining a range within which the controller (10) receives signals respectively from the terminals (20) of which the number is identical to the maximum number of the terminals (20). Upon receiving the first request signal (41), the terminal (20) sends a first response signal (51) within the first limited time period. The controller (10) determines a total number of the terminals (20) on the basis of the number of the first response signals (51) received within the first limited time period, thereby determining a second limited time period defining a range within which the controller (10) receives signals respectively from the terminals (20) of which the number is identical to the total number of the terminals (20). The controller (10) sends the second request signal (42) which indicates the second limited time period. Upon receiving the second request signal (42), the terminal (20) sends a second response signal (52) within the second limited time period.

10 Claims, 7 Drawing Sheets

(56) References Cited

U.S. PATENT DOCUMENTS

| | | | |
|---|---|---|---|
| 2005/0122902 A1* | 6/2005 | Guo et al. | 370/229 |
| 2006/0252439 A1* | 11/2006 | Cai | 455/515 |
| 2007/0133448 A1* | 6/2007 | Gao et al. | 370/311 |
| 2008/0002591 A1* | 1/2008 | Ueno | 370/244 |
| 2008/0240215 A1* | 10/2008 | Nobukiyo et al. | 375/225 |
| 2013/0064236 A1* | 3/2013 | Ji et al. | 370/338 |

* cited by examiner

FIG. 2
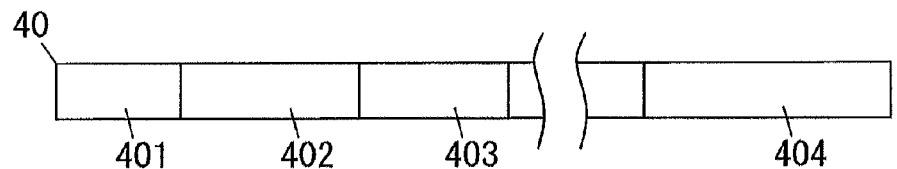
FIG. 3
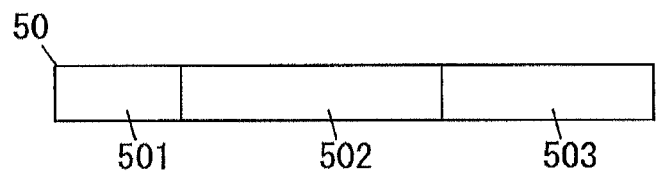
FIG. 4
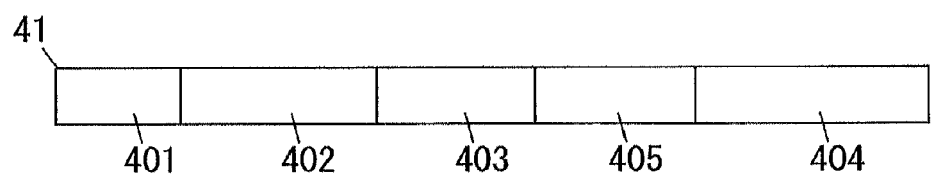
FIG. 5
| IID | RESPONSE NUMBER (TOTAL NUMBER OF TERMINALS HAVING RESPONDED TO FIRST REQUEST SIGNAL) |
|---|---|
| 1 | 2 |
| 2 | 30 |
| 3 | 30 |
| 4 | 15 |
| 5 | 100 |
| 6 | 100 |
| 7 | 80 |
FIG. 6
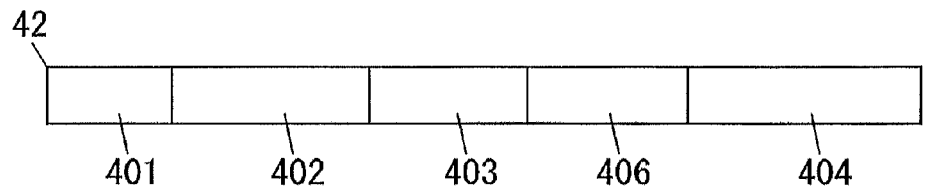

| RESPONSE NUMBER (NUMBER OF RESPONDING TERMINALS) | SECOND LIMITED TIME PERIOD [second] |
|---|---|
| 1~10 | 5 |
| 11~30 | 20 |
| 31~60 | 80 |
| 61~80 | 150 |
| 81~100 | 200 |

| IID | ADAPTIVE LIMITED TIME PERIOD | FIXED FLAG |
|---|---|---|
| 1 | 4 | 0 |
| 2 | 20 | 0 |
| 3 | 20 | 0 |
| 4 | 20 | 1 |
| 5 | 2 | 0 |
| 6 | 5 | 0 |
| 7 | 4 | 1 |

| IID | RESPONSE NUMBER (TOTAL NUMBER OF TERMINALS HAVING RESPONDED TO SECOND REQUEST SIGNAL) |
|---|---|
| 1 | 2 |
| 2 | 30 |
| 3 | 30 |
| 4 | 16 |
| 5 | 1 |
| 6 | 10 |
| 7 | 2 |

NETWORK SYSTEM

TECHNICAL FIELD

The present invention is directed to network systems, and particularly to a network system comprising a controller and a plurality of terminals, each terminal sending a response signal to the controller in response to receiving a request signal from the controller.

BACKGROUND ART

Document 1 (JP 2006-60408 A) discloses a network system including a wireless transmitter and wireless receivers. The wireless transmitter transmits a block ACK request signal to each wireless receiver. The block ACK request signal includes a parameter indicating a range of random numbers used for determining a contention window. Each wireless receiver randomly selects a value of the contention window with reference to the parameters included in the block ACK request signal. Each wireless receiver sends a block ACK (response signal) after a lapse of a waiting time period starting from the time of receiving the block ACK request signal. The waiting time period is determined by use of a DIFS (Distributed Inter Frame Space) and the value of the contention window.

In the network system disclosed in Document 1, each wireless receiver randomly determines the value of the contention window. Consequently, it is possible to reduce the probability of collision between the response signals.

In the network system disclosed in Document 1, the maximum value of the contention window is determined irrespective of the number of the wireless receivers. When the number of the wireless receivers is excessive relative to the maximum value of the contention window, the probability of collision between the response signals can not be reduced sufficiently. Therefore, the wireless transmitter may not receive the response signal. In contrast, when the maximum value of the contention window is excessive relative to the number of the wireless receivers, the waiting time period is likely to be prolonged and communication efficiency may become poor.

DISCLOSURE OF INVENTION

In view of the above insufficiency, the present invention has been aimed to propose a network system capable of reducing the probability of collision between response signals yet improving communication efficiency.

The network system in accordance with the present invention comprises a controller; and a plurality of terminals connected to the controller via a network. The controller comprises a first communication unit configured to communicate with the terminals via the network, a first request unit, a counting unit, a terminal number determination unit, a limited time determination unit, and a second request unit. Each of the terminals comprises a second communication unit configured to communicate with the controller via the network, a first response unit, and a second response unit. The first request unit is configured to send a first request signal to the plurality of the terminals via the first communication unit, the first request signal including first limited time information indicative of a first limited time period. The first limited time period is defined to be a predetermined range within which the first communication unit receives signals respectively from all of a maximum number of the terminals allowed to be connected to the network. The first response unit is configured to, in response to receiving the first request signal via the second communication unit, send a first response signal to the controller via the second communication unit before a lapse of the first limited time period indicated by the first limited information included in the first request signal. The counting unit is configured to count the first response signals which have been received by the first communication unit within the first limited time period, and output the number of the first response signals. The terminal number determination unit is configured to determine a total number of the terminals on the basis of the number of the first response signals obtained from the counting unit. The limited time determination unit is configured to determine a second limited time period being defined to be a range within which the first communication unit receives signals from all of the total number of the terminals determined by the terminal number determination unit. The second request unit is configured to send a second request signal to the plurality of the terminals via the first communication unit, the second request signal including second limited time information indicative of the second limited time period determined by the limited time determination unit. The second response unit is configured to, in response to receiving the second request signal via the second communication unit, send a second response signal to the controller via the second communication unit before a lapse of the second limited time period indicated by the second limited information included in the second request signal.

In a preferred aspect, the controller further comprises a storing means configured to store information derived from the number of the first response signals. The controller is configured to use the information stored in the storing means to create the second request signal and send the created second request signal.

In a more preferred aspect, the storing means is defined as a terminal number storage unit configured to store the total number of the terminals determined by the terminal number determination unit as the information derived from the number of the first response signals. The limited time determination unit is configured to determine the second limited time period by use of the total number of the terminals stored in the terminal number storage unit.

In a further preferred aspect, the controller further comprises a terminal number update unit. The first request unit is configured to control the first communication unit in a manner to send the first request signal to the plurality of the terminals periodically. The terminal number update unit is configured to, when the terminal number destination unit determines the total number of the terminals, update the total number of the terminals stored in the terminal number storage unit with the total number of the terminals determined by the terminal number determination unit.

Alternatively, in a more preferred aspect, the storing means is defined as a limited time storage unit configured to store the second limited time period determined by the limited time determination unit as the information derived from the number of the first response signals. The second request unit is configured to create the second request signal which includes the second limited time information indicative of the second limited time period stored in the limited time storage unit.

In a further preferred aspect, the controller further comprises a limited time update unit. The first request unit is configured to control the first communication unit in a manner to send the first request signal to the plurality of the terminals periodically. The limited time update unit is configured to, when the limited time determination unit determines the second limited time period, update the second limited time period stored in the limited time storage unit with the second limited time period determined by the limited time determination unit.

In a preferred aspect, the first response unit includes a first waiting time determination module, and a first response signal transmitting module. The first waiting time determination module is configured to select a first waiting time period in a random manner from time periods not greater than the first limited time period indicated by the first limited time information included in the first request signal received by the second communication unit. The first response signal transmitting module is configured to send the first response signal to the controller via the second communication unit after a lapse of the first waiting time period. The second response unit includes a second waiting time determination module, and a second response signal transmitting module. The second waiting time determination module is configured to select a second waiting time period in a random manner from time periods not greater than the second limited time period indicated by the second limited time information included in the second request signal received by the second communication unit. The second response signal transmitting module is configured to send the second response signal to the controller via the second communication unit after a lapse of the second waiting time period.

In a preferred aspect, the controller further comprises a correspondence storage unit. The correspondence storage unit is configured to store a correspondence relation between the total number of the terminals and the second limited time period. The limited time determination unit is configured to refer to the correspondence relation stored in the correspondence storage unit, and select the second limited time period corresponding to the total number of the terminals determined by the terminal number determination unit.

In a preferred aspect, the controller further comprises a terminal number storage unit, a limited time storage unit, a second counting unit, a second terminal number determination unit, a second terminal number storage unit, a terminal number comparison unit, and a limited time modification unit. The terminal number storage unit is configured to store the total number of the terminals determined by the terminal number determination unit. The limited time storage unit is configured to store the second limited time period determined by the limited time determination unit. The second counting unit is configured to count the second response signals which have been received by the first communication unit within the second limited time period stored in the limited time storage unit, and output the number of the second response signals. The second terminal number determination unit is configured to determine the total number of the terminals on the basis of the number of the second response signals obtained from the second counting unit. The second terminal number storage unit is configured to store the total number of the terminals determined by the second terminal number determination unit. The terminal number comparison unit is configured to compare the total number of the terminals stored in the terminal number storage unit with the total number of the terminals stored in the second terminal number storage unit, and output a comparison result. The limited time modification unit is configured to shorten the second limited time period when the comparison result indicates that the total number of the terminals stored in the second terminal number storage unit is not less than the total number of the terminals stored in the terminal number storage unit. The limited time modification unit is configured to prolong the second limited time period when the comparison result indicates that the total number of the terminals stored in the second terminal number storage unit is less than the total number of the terminals stored in the terminal number storage unit. The second request unit is configured to send to the plurality of the terminals via the first communication unit the second request signal including the second limited time information indicative of the second limited time period stored in the limited time storage unit.

In a preferred aspect, the limited time modification unit is configured to, upon acknowledging that the comparison result shows that the total number of the terminals stored in the second terminal number storage unit is less than the total number of the terminals stored in the terminal number storage unit once after the limited time modification unit shortens the second limited time period stored in the limited time storage unit from a predetermined period, fix the second limited time stored in the limited time storage unit to the predetermined period.

BRIEF DESCRIPTION OF DRAWINGS

FIG. 2 is a diagram illustrating a configuration of a request signal, FIG. 3 is a diagram illustrating a configuration of a response signal, FIG. 4 is a diagram illustrating a configuration of a first request signal, FIG. 5 is a diagram illustrating a configuration of a response number list of the network system of the first embodiment, FIG. 6 is a diagram illustrating a configuration of a second request signal, FIG. 7 is a diagram illustrating a configuration of a limited time table of the network system of the first embodiment, FIG. 11 is a diagram illustrating a configuration of the limited time table of the network system of the second embodiment, and FIG. 12 is a diagram illustrating a configuration of a second response number list of the network system of the second embodiment.

BEST MODE FOR CARRYING OUT THE INVENTION

First Embodiment

Figure 1:
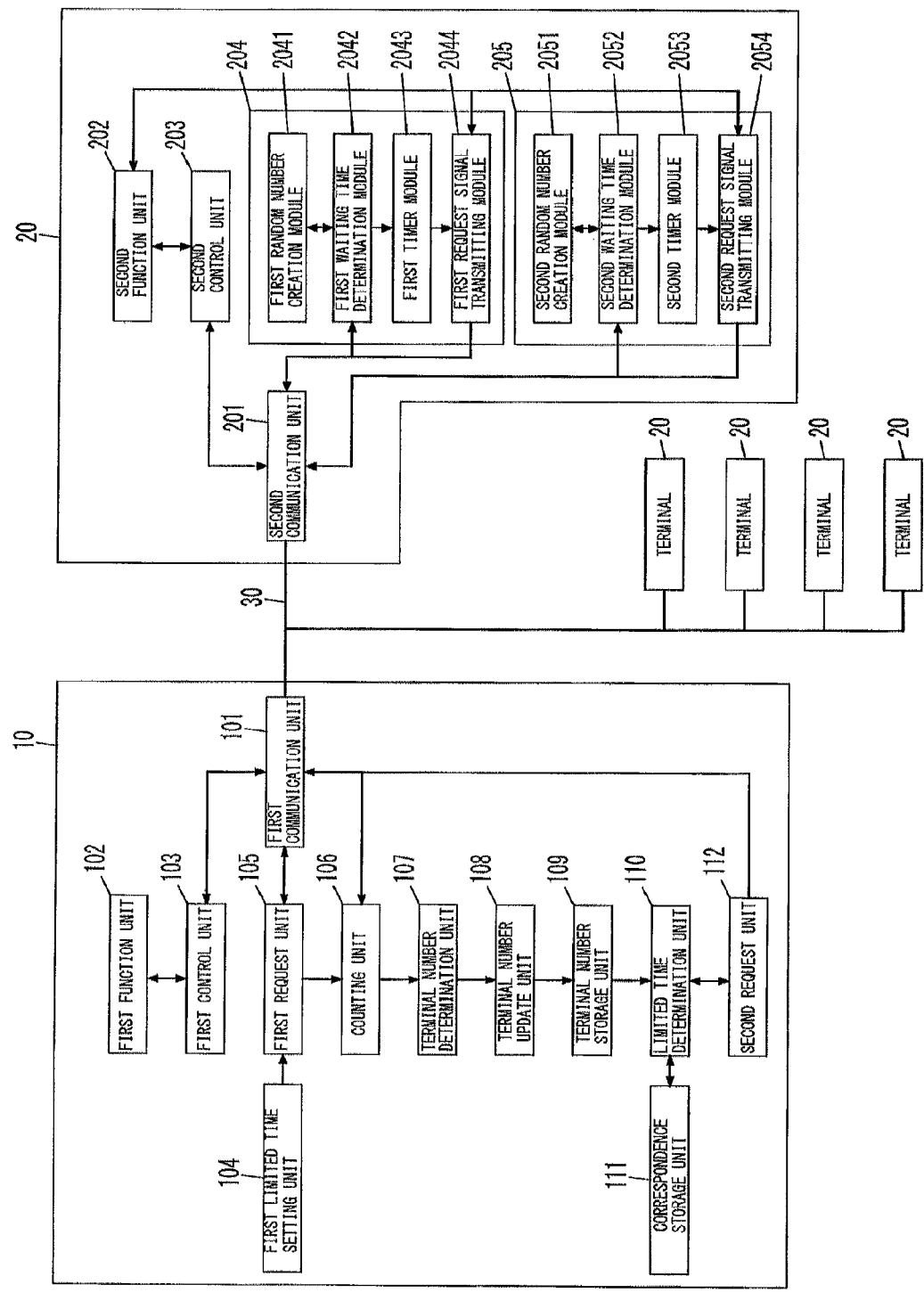
FIG. 1 is a diagram illustrating a configuration of the network system of the first embodiment.

FIG. 1 shows a configuration of the network system of the present embodiment. The network system of the present embodiment includes a controller (multicast terminal device) 10 and a plurality of terminals 20 connected to the controller 10 via a network 30. In the present network system, plural terminal devices (the controller 10 and terminals 20) are connected to the network 30, and communicate with each other. For example, each of the controller 10 and terminals 20 comprises a microcomputer including such as a memory, a processor, and an interface adapted in use to be connected to the network 30. Besides, the network 30 may be a wired network or a wireless network.

The controller 10 is configured to monitor and control each of the terminals 20. In more detail, the controller 10 sends a request signal (response requesting command) to each of the terminals 20. The request signal is a multicast packet such as a request signal for controlling the terminal 20, a request signal for obtaining a status of the terminal 20, and a request signal for changing setting values of the terminal 20. Upon receiving the request signal, the terminal 20 performs processing corresponding to a content of the received request signal. Further, the terminal 20 sends a response signal to the controller 10. The response signal is such as a control completion response signal indicating completion of control, a status announcing response signal including status data, and a setting completion response signal indicating completion of change of settings. The controller 10 receives the response signals from each terminal 20.

The controller 10 includes a first communication unit 101, a first function unit 102, and a first control unit 103. Further, the controller 10 includes a first limited time setting unit 104, a first request unit 105 for sending a request signal 40 (first request signal 41), a counting unit 106, a terminal number determination unit 107, a terminal number update unit 108, a terminal number storage unit 109, a limited time determination unit 110, a correspondence storage unit 111, and a second request unit 111 for sending a request signal 40 (second request signal 42).

The first communication unit 101 is a network interface for communicating with the terminals 20 via the network 30. The first communication unit 101 is configured to store address information peculiar to the controller 10. The first communication unit 101 establishes network communication by use of the stored address information. For example, the address information is an IP address and a physical address (MAC address).

The first function unit 102 is configured to execute processing (operation) for a service (function of the controller 10) to be provided by the controller 10. In the present embodiment, the first function unit 102 communicates with the terminals 20 via the network 30, thereby monitoring and controlling the terminals 20.

The terminal 20 may be lighting apparatus or air conditioning apparatus. The lighting apparatus is configured to turn on and off lighting equipment and to dim the lighting equipment. The air conditioning apparatus is configured to drive air conditioning equipment.

Each of the terminals 20 includes a second communication unit 201, a second function unit 202, and a second control unit 203. Each of the terminals 20 further includes a first response unit 204 for sending a response signal 50 (first response signal 51), and a second response unit 205 for sending a response signal 50 (second response signal 52).

The second communication unit 201 is a network interface for communicating with the controller 10 via the network 30. The second communication unit 201 is configured to store address information peculiar to the terminal 20. The second communication unit 201 establishes the network communication by use of the stored address information. For example, the address information is an IP address and a physical address (MAC address).

The second function unit 202 is configured to execute processing (operation) for a service (function of the terminal 20) to be provided by the terminal 20. The second function unit 202 is a target to be controlled or monitored by the controller 10. When the terminal 20 is lighting apparatus, the second function unit 202 is a lighting means for turning on and off a lighting load (lighting equipment) and of dimming the same. When the terminal 20 is air conditioning apparatus, the second function unit 202 is an air conditioner controlling means for controlling air conditioning equipment to regulate a room temperature.

For the purpose of giving an object server function to the first and second control units 103 and 203, each of the first and second control units 103 and 203 is provided with a software module including objects which are used to perform processing for providing a service.

Each object has one or more interfaces (input output definition). The interface defines control information or monitoring information (e.g., a variable, function, event information, and a combination thereof) corresponding to the service to be provided by the function unit 102 or 202 (the service to be provided by the controller 10 or the terminal 20).

The object has an object unique identifier (referred to as "OID", if necessary) uniquely. The interface has an interface identifier (referred to as "IID", if necessary) uniquely. There is a specific identifier which is allocated to a combination of the object and the interface. In the following, a content of the specific identifier is expressed as [OID+IID].

The first control unit 103 functions as an object controlling means and a response signal sending means. The second control unit 203 functions as a request signal sending means configured to create the request signal using the specific identifier and send the created request signal.

The object controlling means is configured to, upon receiving the request signal using the specific identifier, operate the object in response to the content of the request signal to provide the control information to the function unit 102. In addition, the object controlling means is configured to perform processing of obtaining the monitoring information from the function unit 102. The object controlling means is configured to perform processing of obtaining information regarding the object. The object controlling means is configured to perform processing of providing a function for indicating operation to the function unit 102. The object controlling means is configured to perform processing of obtaining the variable indicating the current status of the function unit 102. The object controlling means is configured to perform processing of obtaining the event information indicating change in the status of the function unit 102.

The response signal sending means is configured to send the response signal to the terminal device which is the sender of the request signal. The response signal includes a result of the processing executed by the object controlling means.

FIG. 2 shows a configuration of the request signal 40. The request signal 40 includes an operation code 401, the interface identifier 402, and the object unique identifier 403. The operation code 401 denotes the type of the response requesting command. The interface identifier 402 denotes the service (function) provided by the terminal device. The object unique identifier 403 denotes the control target or the monitoring target. Further, the request signal 40 may include a parameter 404 depending on the type of the operation code. When the terminal 20 has the object having the specific identifier which is defined by the interface identifier 402 and the object unique identifier 403 included in the request signal 40, the terminal 20 receives the request signal 40 via the second communication unit 201.

For example, the operation code 401 includes "Watch", "Get", "Set", and "Invoke". The operation code "Watch" is used to request a search for determining whether or not the object having the OID and IID designated by the request signal 40 is present in the network 30. The operation code "Get" is used to request to obtain a value of the object having the OID and IID designated by the request signal 40. The operation code "Set" is used to request to set a value to the object having the OID and IID designated by the request signal 40. The operation code "Invoke" is used to request to execute the object having the OID and IID designated by the request signal 40 to provide the control information to the function unit 202.

A wildcard "*" is available in the request signal 40. The wildcard denotes any of OIDs or IIDs. For example, when the controller 10 sends the request signal having the object unique identifier 403 of "*", the interface identifier 402 of "*", and the operation code 401 of "Watch", all of the terminals 20 receives the request signal, and sends the response signal including the combination of the object and the interface to the controller 10.

For example, the controller 10 sends the request signal in which only the interface identifier 402 is the wildcard "*" and the operation code 401 denotes the "Watch". Upon receiving the request signal, the terminal 20 sends, to the controller 10, the response signal including the combination of the OID designated by the request signal and the interface of the OID designated by the request signal.

For example, the controller 10 sends the request signal in which only the object unique identifier 403 is the wildcard "*" and the operation code 401 denotes the "Watch". Upon receiving the request signal, the terminal 20 sends, to the controller 10, the response signal including the combination of the IID designated by the request signal and the OID including the IID designated by the request signal.

In the present embodiment, using the wildcard "*" as the object unique identifier 403 of the request signal 40 enables multicast communication.

FIG. 3 illustrates the response signal 50. The response signal 50 includes an operation code 501 and terminal identification information 502. The operation code 501 denotes the type of the response signal 50. The terminal identification information 502 denotes the identification information (in the present embodiment, the address of the terminal 20) of the terminal 20 being the sender of the response signal. Further, the response signal 50 may include a specific parameter 503 depending on the type of the operation code 501.

For example, upon receiving the request signal 40 having the operation code 401 of "Watch", the terminal 20 sends the response signal 50 having the operation code 501 of "Provide". In this instance, the response signal 50 includes the parameter 503 which denotes the combination of the object unique identifier and the interface identifier which are designated by the request signal 40.

Besides, the plural objects may have the interface (i.e., the interface having the same IID) which has the same definition corresponding to the service provided by the terminal device.

An OSI 7-layer model is used as the protocol for the network system of the present embodiment. As an application layer of the uppermost layer, a unique object access protocol (OAP) is used to give and receive the information such as the variable, the function and the event information between software modules of the controller 10 and the terminal 20.

When the first control unit 103 sends the request signal 40 to the terminals 20, at first the first control unit 103 provides a request of sending the first request signal 41 to the first request unit 105, and subsequently provides a request of sending the second request signal 42 to the second request unit 111. The first and second request signals include the same interface identifier 402 and object identifier 403.

The first request unit 105 is configured to, in response to receiving the request of sending the first request signal 41, send the first request signal 41 to the plurality of the terminals 20 via the first communication unit 101. The first request unit 105 is configured to send the first request signal 41 to the plurality of the terminals 20 via the first communication unit 101 periodically.

The first request signal 41 includes the operation code 401, the interface identifier 402, the object unique identifier 403, and first limited time information 405. The first request signal 41 may include the specific parameter 404 depending on the type of the operation code 401. The first limited time period indicates a predetermined limited time period (first limited time period).

The first limited time setting unit 104 is an input device for inputting the first limited time period. The first limited time period defines a time period [sec] starting at the time at which the terminal 20 receives the first request signal and ending at the time at which the terminal 20 sends the first response signal 51. In other words, the terminal 20 performs operation corresponding to the operation code 401 of the first request signal 41 and sends the first response signal 51 to the controller 10 before a lapse of the first limited time period starting from the time of receiving the first request signal 41. The first limited time period is defined to be a predetermined range within which the first communication unit 101 receives signals (first response signals 51) respectively from all of a maximum number of the terminals 20 allowed to be connected to the network 30. In other words, the first limited time period is defined as a time period within which the controller 10 successfully receives all the response signals respectively sent from all of the maximum number of the terminals 20 allowed to be connected to the network 30. The first limited time period is determined on the basis of the transport used by the network 30. The communication speed of the transport is important for determining the first limited time period. As described below, the terminal 20 determines a first waiting time period (first response time period) in a random manner. The first waiting time period varies from 0 to the first limited time period theoretically. However, practically, the first waiting time period does not always vary theoretically. Therefore, the first limited time period need have an enough range such that the plural terminals 20 have the different first waiting time periods. In addition, the first limited time period is predetermined not to be less than a time period within which the target terminal 20 completes the communication at the speed identical to the communication speed of the transport. In the following explanation, the first limited time period is referred to as "maximum limited time period $T_{10}$", if necessary.

The first response unit 204 is configured to, upon receiving the first request signal 41 via the second communication unit 201, send the first response signal 51 to the controller 10 via the second communication unit 201 before a lapse of the first limited time period indicated by the first limited time information 405 included in the first request signal 41. The first response unit 204 includes a first random number creation module 2041, a first waiting time determination module 2042, a first timer module 2043, and a first response signal transmitting module 2044.

The first random number creation module 2041 is configured to create a random number within the range of 0 to 100. The first random number creation module 2041 provides the resultant random number to the first waiting time determination module 2042.

The first waiting time determination module 2042 is configured to request the first random number creation module 2041 to create the random number upon receiving the first request signal 41 via the second communication unit 201. The first waiting time determination module 2042 is configured to calculate the first waiting time period upon obtaining the random number from the first random number creation module 2041. The first waiting time period is determined on the basis of a quotient obtained by dividing a product by 100, the product being obtained by multiplying the first limited time period of the first limited time information 405 included in the first request signal 41 by the random number (obtained from the first random number creation module 2041). Consequently, the first waiting time determination module 2042 determines the first waiting time period randomly within the range of 0 to the first limited time period [sec].

Upon obtaining the first waiting time period from the first waiting time determination module 2042, the first timer module 2043 starts timing processing of measuring the first waiting time period. When the first waiting time period elapses, the first timer module 2043 notifies the first response signal transmitting module 2044 of the lapse of the first waiting time period.

Upon being notified of the lapse of the first waiting time period, the first response signal transmitting module 2044 operates the object designated by the operation command 401 of the first request signal 41, and sends the first response signal 51. The first response signal 51 has the substantially same configuration as that of the response signal 50.

Each terminal 20 having the specific identifier designated by the first request signal 41 is configured to send the first response signal 51 to the controller 10 at a randomly determined timing, ideally dispersed evenly between 0 (zero) to 10 (ten) seconds of maximum limited time. The maximum limited time period $T_{10}$ is given so that the controller 10 can successfully receive the first response signals 51 respectively from all of the maximum number of the terminals 20 allowed to be connected to the network 30. Therefore, the controller 10 can receive the first response signals 51 respectively from all of the terminals 20 connected to the network 30. The number of the terminals 20 having the specific identifier designated by the first request signal 41 is not greater than the maximum number of the terminals 20 allowed to be connected to the network 30. Therefore, the controller 10 can receive the first response signals 51 respectively sent from the terminals 20 having the specific identifier designated by the first request signal 41.

The counting unit 106 is configured to count the first response signals 51 which have been received by the first communication unit 101 within the first limited time period. The counting unit 106 counts the first response signals 51 received by the first communication unit 101 until the first limited time period elapses from the time at which the first communication unit 101 sends the first request signal 41. After the first limited time period has elapsed, the counting unit 106 provides the number of the first response signals 51 to the terminal number determination unit 107.

The terminal number determination unit 107 is configured to determine a maximum number (total number) of the terminals 20 responding to the controller 10 on the basis of the number of the first response signals 51 obtained from the counting unit 106. In other words, the terminal number determination unit 107 determines the maximum number of the terminals 20 which send the first response signal 51 to the controller 10 in response to receiving the first request signal 41. The terminal number determination unit 107 regards the number of the first response signals 51 obtained from the counting unit 106 as the total number of the terminals 20.

The terminal number storage unit 109 is used for storing the total number of the terminals 20 determined by the terminal number determination unit 107. The terminal number storage unit 109 stores a response number list 1091 as shown in FIG. 5. According to the response number list 1091 shown in FIG. 5, the numbers of the terminals 20 responding to the first request signals 41 including the object unique identifiers 403 of "*" and the interface identifiers 402 of "1", "2", "3", "4", "5", "6", and "7" are 2, 30, 30, 15, 100, 100, and 80, respectively.

As described in the above, the response number list 1091 shows a correspondence relation between the specific identifier (IID of the object, in the instance shown in FIG. 5) of the first request signal 41 and the number of the terminals 20 responding to the first request signal 41 having the corresponding specific identifier. That is, the terminal number storage unit 109 stores the total number of the terminals 20 for each specific identifier. In other words, the total number of the terminals 20 is stored for each of the first response signals 41 having different execution contents. Thus, the limited time period can be optimized for each first request signal 41 even if the first request signals 41 have the different execution contents. Besides, the controller 10 can send the first request signal 41 for each specific identifier used in the network 30. In this instance, it is possible to create the response number list 1091 which indicates the relation between the total number of the terminals 20 and the specific identifier for all of the specific identifiers.

When the terminal number determination unit 107 determines the total number of the terminals 20, the terminal number update unit 108 stores the total number of the terminals 20 in the terminal number storage unit 108. Further, the terminal number update unit 108 is configured to, when the terminal number determination unit 107 newly determines the total number of the terminals 20, update the total number of the terminals 20 stored in the terminal number storage unit 109 in match with the total number of the terminals 20 newly determined by the terminal number determination unit 107.

The correspondence storage unit 111 is configured to store a limited time table 1111 (see FIG. 7) indicative of a correspondence relation between the total number of the terminals 20 (the total number of the terminals 20 which has responded to the first request signal 41) and the second limited time period. The limited time table 1111 shows a response number (the total number of the terminals 20 responding to the first request signal 41) which is associated with the second limited time period. In FIG. 7, the second limited time period is associated with a range of the response number. The second limited time period is defined to be a range within which the first communication unit 101 receives signals (second response signals 52) respectively from all of the total number of the terminals 20 determined by the terminal number determination unit 107. In other words, the second limited time period is defined as a time period within which the controller 10 successfully receives all the second response signals 52 respectively sent from all of the terminals 20 including the object designated by the second request signal 42. The second limited time period is determined on the basis of the transport used by the network 30. Like the determination of the first limited time period, the communication speed of the transport is important for determining the second limited time period. As described below, the terminal 20 determines a second waiting time period (second response time period) in a random manner. The second waiting time period varies from 0 to the second limited time period theoretically. However, practically, the second waiting time periods does not always vary theoretically. Therefore, the second limited time period need have an enough range such that the plural terminals 20 have the different second waiting time periods. In addition, the second limited time period is determined not to be less than the time period within which the targeted terminal 20 completes the communication at the speed identical to the communication speed of the transport. In the following explanation, the second limited time period is referred to as an "adaptive limited time period $T_{20}$", if necessary.

The limited time determination unit 110 is configured to determine the second limited time period on the basis of the total number of the terminals determined by the terminal number determination unit 107. In the present embodiment, the limited time determination unit 110 is configured to refer to the limited time table 1111 stored in the correspondence storage unit 111 and select the second limited time period corresponding to the total number of the terminals 20 determined by the terminal number determination unit 107. Besides, the limited time determination unit 110 is configured to determine the second limited time period by use of the total number of the terminals 20 stored in the terminal number storage unit 109 once after the terminal number storage unit 109 has stored the total number of the terminals 20.

The second request unit 112 is configured to control the first communication unit 101 so as to send the second request signal 42 (see FIG. 6) to the plurality of the terminal 20 via the first communication unit 101. In response to receiving the request of sending the second request signal 42, the second request unit 112 requests the limited time determination unit 110 to determine the second limited time period. The limited time determination unit 110 determines the second limited time period on the basis of the total number of the terminals 20 stored in the terminal number storage unit 109 and provides the resultant second limited time period to the second request unit 112 in response to the request from the second request unit 112.

The second request signal 42 includes, as shown in FIG. 6, the operation code 401, the interface identifier 402, the object unique identifier 403, and second limited time information 406. The second limited time information 406 indicates the second limited time period determined by the limited time determination unit 110. The second request signal 42 may include the specific parameter 404 depending on the type of the operation code 401. The second request signal 42 and the first request signal 41 have the same operation code 401, interface identifier 402, and object unique identifier 403. In other words, the second request unit 113 sends the second request signal 42 to the terminal 20 which sends the first response signal 51 to the controller 10 in response to the first request signal 41.

The second response unit 205 is configured to, upon receiving the second request signal 42 via the second communication unit 201, send the second response signal 52 to the controller 10 via the second communication unit 201 within the second limited time period indicated by the second limited time information 406 included in the second request signal 42. The second response unit 205 includes a second random number creation module 2051, a second waiting time determination module 2052, a second timer module 2053, and a second response signal transmitting module 2054.

The second random number creation module 2051 is configured to create a random number within the range of 0 to 100. The second random number creation module 2051 provides the resultant random number to the second waiting time determination module 2052.

The second waiting time determination module 2052 is configured to request the second random number creation module 2051 to create the random number upon receiving the second request signal 42 via the second communication unit 201. The second waiting time determination module 2052 is configured to calculate the second waiting time period upon obtaining the random number from the second random number creation module 2051. The second waiting time period is determined on the basis of a quotient obtained by dividing a product by 100, the product being obtained by multiplying the second limited time period of the second limited time information 406 included in the second request signal 42 by the random number (obtained from the second random number creation module 2051). Consequently, the second waiting time determination module 2052 determines the second waiting time period randomly within the range of 0 to the second limited time period [sec].

Upon obtaining the second waiting time period from the second waiting time determination module 2052, the second timer module 2053 starts timing processing of measuring the second waiting time period. When the second waiting time period elapses, the second timer module 2053 notifies the second response signal transmitting module 2054 of the lapse of the second waiting time period.

Upon being notified of the lapse of the second waiting time period, the second response signal transmitting module 2054 operates the object designated by the operation command 401 of the second request signal 42, and sends the second response signal 52. The second response signal 52 has the substantially same configuration as that of the response signal 50.

Figure 8:
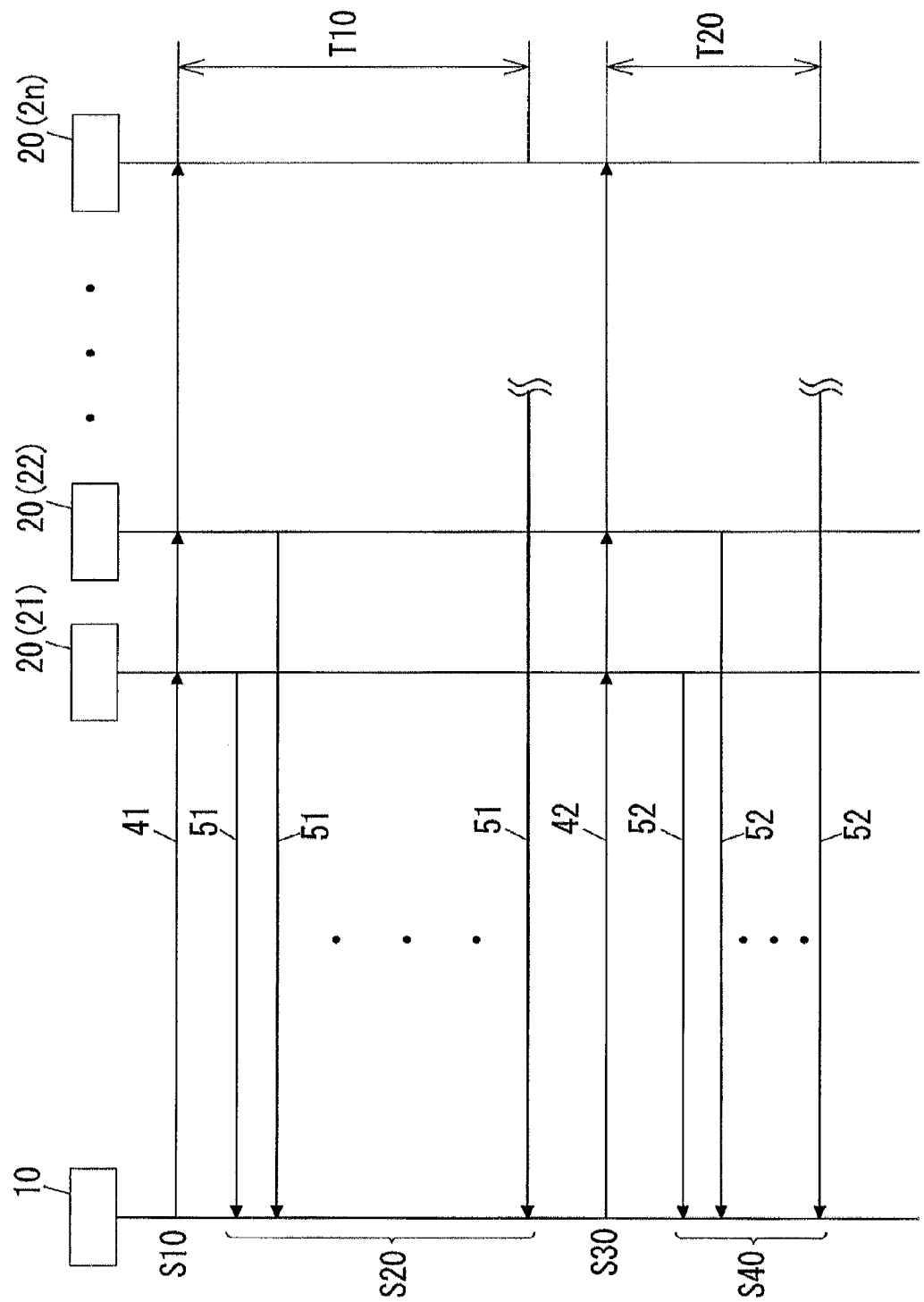
FIG. 8 is a sequence diagram illustrating operation of the network system of the first embodiment.

Next, an explanation using FIG. 8 is made to operation of the network system of the present embodiment. In the following explanation, in order to distinguish between the plural terminals 20, the terminals 20 are respectively designated by use of reference numerals 21, 22, . . . , 2n, if necessary.

The terminal 21 includes the object having the object unique identifier "OID1". The object having "OID1" includes interfaces respectively having the interface identifiers "IID5" and "IID7".

The terminal 22 includes the object having the object unique identifier "OID2". The object having "OID2" includes interfaces respectively having the interface identifiers "IID3" and "IID7".

The other terminals 20 include the object containing the interface having the interface identifier "IID7".

In the following explanation, the maximum number of the terminals 20 allowed to be connected to the network 30 is 100. Further, the maximum number of the terminals 20 which send the first response signal 51 in response to receiving the first request signal 41 (that is, the number of the terminals 20 including the interface having the interface identifier "IID7") is 80.

As to the controller 10, the first request unit 105 sends periodically the first request signal 41 to the plurality of the terminals 20 via the first communication unit 101 ($S_{10}$). For example, the first request signal 41 includes the operation code 401 of "Watch", the object unique identifier 403 of "*", the interface identifier 402 of "IID7". Since the maximum number of the terminals 20 allowed to be connected to the network 30 is 100, the first limited time period is defined to have a range within which the controller 10 receives the first response signals 51 respectively sent from all of the hundred terminals 20.

Only the terminal 20 including the interface having the interface identifier "IID7" receives the first request signal 41. In the terminal 20 which has received the first request signal 41, the first waiting time determination module 2042 determines the first waiting time period on the basis of the maximum limited time period $T_{10}$ indicated by the first limited time information 405 of the first request signal 41. The first response signal transmitting module 2044 sends the first response signal 51 via the second communication unit 201 after a lapse of the first waiting time period determined by the first waiting time determination module 2042 ($S_{20}$). As to the first response signal 51, the operation code 501 is "Provide".

The terminal identification information 502 denotes the address of the terminal 20 being the sender of the first response signal 51. The parameter 503 is the combination of the interface identifier "IID7" and the object unique identifier associated with the interface identifier "IID7".

For example, the terminal 21 transmits the first response signal 51 including the parameter 503 indicating the combination of the interface identifier "IID7" and the object unique identifier "OID1". The terminal 22 transmits the first response signal 51 including the parameter 503 indicating the combination of the interface identifier "IID7" and the object unique identifier "OID2".

In the controller 10, the counting unit 106 counts the first response signals 51 which the first communication unit 101 has received within the first limited time period $T_{10}$. The terminal number determination unit 107 adopts, as the maximum number of the terminals 20, the number of the first response signals 51 obtained from the counting unit 106. That is, the terminal number determination unit 107 determines the maximum number of the terminals 20 including the interface having the interface identifier "IID7". As described in the above, the number of the terminals 20 including the interface having the interface identifier "IID7" is 80. Therefore, the terminal number determination unit 107 adopts, as the total number of the terminals 20, the number (=80) of the first response signals 51 which the first communication unit 101 has received within the first limited time period $T_{10}$. The total number of the terminals 20 determined by the terminal number determination unit 107 is associated with the specific identifier of the first request signal 41 and is stored in the terminal number storage unit 109 (see FIG. 5).

Upon receiving the request of sending the second request signal 42, the second request unit 112 requests the limited time determination unit 110 to determine the limited time period.

In response to the request from the second request unit 112, the limited time determination unit 110 determines the second limited time period T20 and provides the second limited time period T20 to the second request unit 112. The limited time determination unit 110 refers to the total number of the terminals 20 stored in the terminal number storage unit 109 and the limited time table 1111 stored in the correspondence storage unit 111, and determines the second limited time period. T20. When the total number of the terminals 20 determined by the terminal number determination unit 107 is 80, the limited time determination unit 110 selects the second limited time period T20 of 150 [sec]. Since the second limited time period is defined to have a range within which the controller 10 receives the first response signals 51 respectively sent from all of the eighty terminals 20, the second limited time period is less than the first limited time period.

The second request unit 112 sends the second request signal 42 to the plurality of the terminals 20 via the first communication unit 101 (S30). The second request signal 42 includes the same operation code 401 (="Watch"), object unique identifier 403 (="*"), and interface identifier 402 (="IID7") as those of the first request signal 41. Further, the second request signal 42 includes the second limited time information 406 indicative of the second limited time period determined by the limited time determination unit 110.

Like the first request signal 41, the second request signal 42 is received by only the terminal 20 including the interface having the interface identifier "IID7". In the terminal 20 which has received the second request signal 42, the second waiting time determination module 2052 determines the second waiting time period on the basis of the adaptive limited time period T20 indicated by the second limited time information 406 of the second request signal 42. The second response signal transmitting module 2054 sends the second response signal 52 via the second communication unit 201 after a lapse of the second waiting time period determined by the second waiting time determination module 2052 (S40). As to the second response signal 52, the operation code 501 is "Provide". The terminal identification information 502 denotes the address of the terminal 20 being the sender of the second response signal 52. The parameter 503 is the combination of the interface identifier "IID7" and the object unique identifier associated with the interface identifier "IID7".

As described in the above, the network system of the present embodiment includes the controller 10 and the plurality of the terminals 20 connected to the controller 10 via the network 30. The controller 10 includes the first communication unit 101 configured to communicate with the terminal 20 via the network 30, the first request unit 105, the counting unit 106, the terminal number determination unit 107, the limited time determination unit 110, and the second request unit 112. Each of the terminals 20 includes the second communication unit 201 configured to communicate with the controller 10 via the network 30, the first response unit 204, and the second response unit 205. The first request unit 105 is configured to send the first request signal 41 to the plurality of the terminals 20 via the first communication unit 101, the first request signal 41 including first limited time information 405 indicative of the first limited time period. The first limited time period is defined to be a predetermined range within which the first communication unit 101 receives signals respectively from all of the maximum number of the terminals 20 allowed to be connected to the network 30. The first response unit 204 is configured to, in response to receiving the first request signal 42 via the second communication unit 201, send the first response signal 51 to the controller 10 via the second communication unit 201 before a lapse of the first limited time period indicated by the first limited information 405 included in the first request signal 41. The counting unit 106 is configured to count the first response signals 51 which have been received by the first communication unit 101 within the first limited time period, and output the number of the first response signals 51. The terminal number determination unit 107 is configured to determine the total number of the terminals 20 on the basis of the number of the first response signals 51 obtained from the counting unit 106. The limited time determination unit 110 is configured to determine the second limited time period being defined to be a range within which the first communication unit 101 receives signals from all of the total number of the terminals 20 determined by the terminal number determination unit 107. The second request unit 112 is configured to send the second request signal 42 to the plurality of the terminals 20 via the first communication unit 101, the second request signal 42 including second limited time information 406 indicative of the second limited time period determined by the limited time determination unit 110. The second response unit 205 is configured to, in response to receiving the second request signal 42 via the second communication unit 201, send the second response signal 52 to the controller 10 via the second communication unit 201 before a lapse of the second limited time period indicated by the second limited information 406 included in the second request signal 42.

According to the network system of the present embodiment, the controller 10 transmits the first request signal to the terminals 20, the first request signal 41 being indicative of the time period (first limited time period) within which the first communication unit 101 can receive all the signals respectively from the maximum number of the terminals 20 allowed to be connected to the network 30. The controller 10 determines the total number of the terminals 20 by use of the number of the first response signals 51 respectively sent from the terminals 20 responding to the first request signal 41. The controller 10 determines the time period (second limited time period) within which the first communication unit 101 can receive all the signals respectively from the terminals 20 in the number identical to the determined total number of the terminals 20. The controller 10 transmits, to the terminals 20, the second request signal 42 indicative of the second limited time period.

With respect to the network system of the present embodiment, the limited time period (second limited time period) defining a maximum time range from the time at which the terminal 20 receives the request signal to the time at which the terminal 20 sends the response signal is determined on the basis of the number of the terminals 20 which send the response signal (second response signal 52) to the controller 10. Therefore, the limited time period can be prevented from becoming too short or long in relation to the number of the terminals 20. Thus, the network system of the present embodiment can prevents the collision between the response signals, yet improving communication efficiency.

Further, the first response unit 204 includes the first waiting time determination module 2042, and the first response signal transmitting module 2044. The first waiting time determination module 2042 is configured to select the first waiting time period in a random manner from time periods not greater than the first limited time period indicated by the first limited time information 405 included in the first request signal 41 received by the second communication unit 201. The first response signal transmitting module 2044 is configured to send the first response signal 51 to the controller 10 via the second communication unit 201 after a lapse of the first waiting time period. The second response unit 205 includes the second waiting time determination module 2052, and the second response signal transmitting module 2054. The second waiting time determination module 2052 is configured to select the second waiting time period in a random manner from time periods not greater than the second limited time period indicated by the second limited time information 406 included in the second request signal 42 received by the second communication unit 201. The second response signal transmitting module 2054 is configured to send the second response signal 52 to the controller 10 via the second communication unit 201 after a lapse of the second waiting time period.

In accordance with the network system of the present embodiment, each of the terminals 20 is responsive to the request signal (first request signal 41 or second request signal 42) from the controller 10 for sending the response signal (first response signal 51 or second response signal 52) at a timing which is randomly determined at each of the terminals 20. Ideally, the timings determined respectively for the terminals 20 are distributed evenly within the limited time range (determined by the first limited time period or second limited time period) provided by the controller 10 (e.g., the range of 0 to 150 [sec]). Therefore, even when the network 30 employs the communication transport providing relatively low speed communication, it is possible to reduce the packet loss otherwise caused by collision between the response signals (first response signals 51 or second response signals 52).

In the network system of the present embodiment, the controller 10 includes the terminal number storage unit 109 configured to store, as information derived from the number of the first response signals 51 received by the first communication unit 101, the total number of the terminals 20 determined by the terminal number determination unit 107. The limited time determination unit 110 is configured to determine the second limited time period on the basis of the total number of the terminals 20 stored in the terminal number storage unit 109 once after the terminal number storage unit 109 stores the total number of the terminals 20. Therefore, the second request unit 112 generates the second request signal 42 including the second limited time information 406 indicative of the second limited time period determined on the basis of the total number of the terminals 20 stored in the terminal number storage unit 109. The first communication unit 101 sends the second request signal 42 prepared in the aforementioned manner.

In other words, the controller 10 includes a storing means (terminal number storage unit 109) configured to store information (the total number of the terminals 20) derived from the number of the first response signals 51 which the first communication unit 101 has received. The controller 10 is configured to use the information stored in the storing means to create the second request signal 42 and send the created second request signal 42.

As described in the above, the controller 10 includes the terminal number storage unit 109 configured to store the total number of the terminals 20 responding to the first request signal 41. Accordingly, once after the terminal number storage unit 109 has stored the total number of the terminals 20, there is no need for determining the total number of the terminals 20 responding to the first request signal 41, and the first request signal 41 need not be sent. Thus, it is unnecessary to send a set of the first and second request signals 41 and 42 every time for the purpose of obtaining the second response signal 52 from the terminal 20. Consequently, it is possible to reduce the communication traffic, and to shorten the transmission processing. Especially, the network system of the present embodiment is suitable for a network system which sees little change in the number of the terminals 20.

Further, the controller 10 includes the terminal number update unit 108. The first request unit 105 is configured to send the first request signal 41 to the plurality of the terminals 20 periodically via the first communication unit 101. The terminal number update unit 108 is configured to, when the terminal number determination unit 107 determines the total number of the terminals 20, update the total number of the terminals 20 stored in the terminal number storage unit 109 with the total number of the terminals 20 determined by the terminal number determination unit 107.

In other words, the controller 10 updates the total number of the terminals 20 stored in the terminal number storage unit 110 periodically. For example, the controller 10 multicasts the first request signal 41 periodically to update the response number list 1091. Alternatively, the controller 10 may be configured to multicast the first request signal 41 each time the controller 10 repeats multicasting the second request signal 42 a predetermined number of times. In this instance, the controller 10 updates the response number list 1091 in a similar manner. Therefore, the controller is enabled to adapt itself to the change in the configuration (the number of the terminals 20) of the network system. Moreover, the second limited time period can be set to an appropriate time period depending on the number of the terminals 20.

In the network system of the present embodiment, the controller 10 further includes the correspondence storage unit 111. The correspondence storage unit 111 is configured to store the correspondence relation between the total number of the terminals 20 and the second limited time period. The limited time determination unit 110 is configured to refer to the correspondence relation stored in the correspondence storage unit 111, and select the second limited time period corresponding to the total number of the terminals 20 determined by the terminal number determination unit 107.

Consequently, the second limited time period can be easily determined.

Besides, each of the response units 204 and 205 may determine the waiting time period (i.e., the first and second waiting time periods) by use of, instead of the random number, a serial number or address (address ended with a number) allocated to the terminal 20. For example, the controller 10 sends the request signal (firs request signal 41 or second request signal 42) including the response control data indicative of the number which is an odd number or even number. The terminal 20 compares its serial number (or the number in the end of its address) with the number indicated by the response control data included in the received request signal. Upon acknowledging that the serial number (or the number in the end of the address) is identical to the number indicated by the response control data, the terminal 20 sets the waiting time period (i.e., the first and second waiting time period) to a first time period which is predetermined on the basis of the limited time period (i.e., the first and second limited time period). Upon acknowledging that the serial number (or the number in the end of the address) is different from the number indicated by the response control data, the terminal 20 sets the waiting time period (i.e., the first and second waiting time period) to a second time period which is different from the first time period.

Alternatively, the waiting time period may be associated with the serial number (or the number in the end of the address) of the terminal 20. Besides, the serial number (or the number in the end of the address) of the terminal 20 may be a single-digit figure or a multiple-digit number. The waiting time period may be associated with a vendor ID of a device ID of a MAC address of the terminal 20. The waiting time period may be associated with a divisor of the serial number or the number in the end of the address of the terminal 20. The waiting time period may be determined on the basis of a sign of the serial number or the number in the end of the address, or the like. The waiting time period may be a remainder of division of the serial number (or address) of the terminal by the maximum number of the terminals allowed to be connected to the network 30, the remainder being further multiplied by the limited time period included in the request signal.

Figure 9:
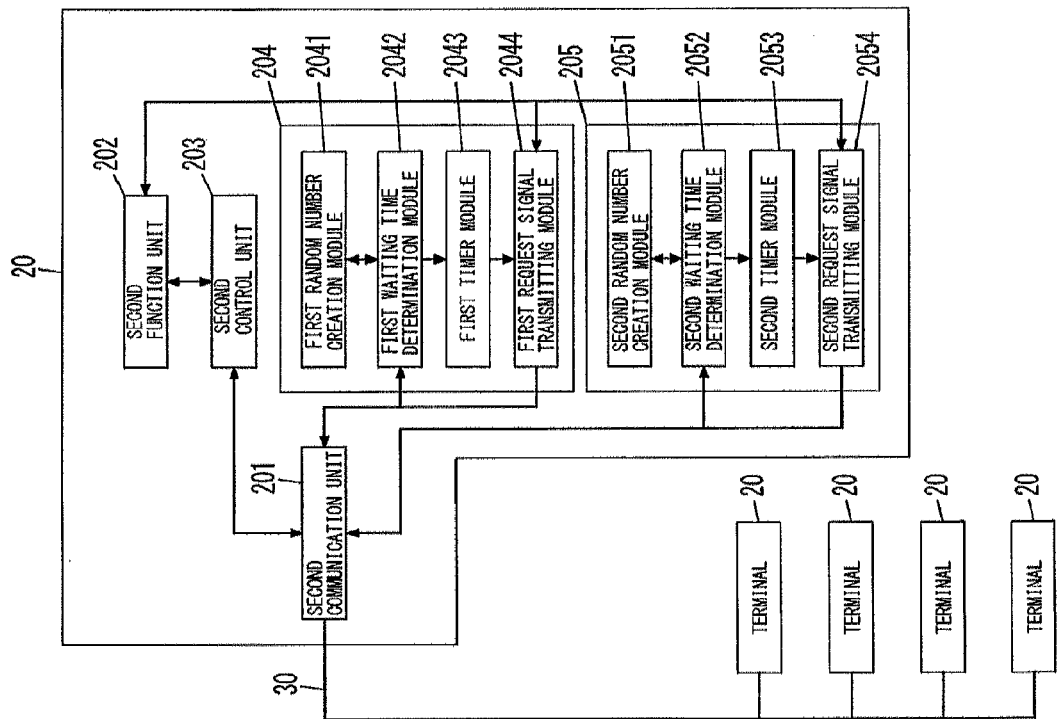
FIG. 9 is a diagram illustrating a configuration of a modification of the network system of the first embodiment.
Figure 9:
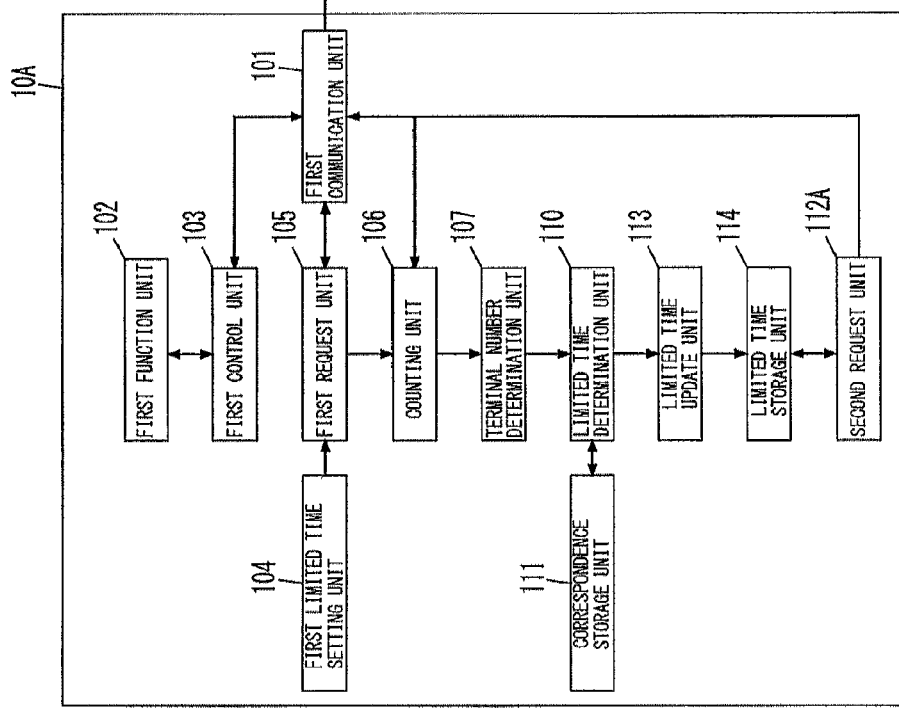

FIG. 9 illustrates the network system according to a modification of the present embodiment. The network system of the modification includes the controller 10A and the plurality of terminals 20 connected to the controller 10A via the network 30. Components common to the network system of the modification and the network system of the present embodiment are designated by same reference numerals, and no explanations thereof are deemed necessary.

The controller 10A includes the first communication unit 101, the first function unit 102, and the first control unit 103. Further, the controller 10A includes the first limited time setting unit 104, the first request unit 105, the counting unit 106, the terminal number determination unit 107, the limited time determination unit 110, the correspondence storage unit 111, a limited time update unit 113, a limited time storage unit 114, and the second request unit 112A.

The limited time storage unit 114 is used for storing the limited time determined by the limited time determination unit 110. For example, the limited time storage unit 114 stores a limited time list. The limited time list indicates a correspondence relation between the specific identifier of the first request signal 41 and the second limited time period determined on the basis of the number of the terminals 20 responding to the first request signal 41 including the corresponding specific identifier. In other words, the limited time storage unit 114 stores the second limited time period for each specific identifier.

The limited time update unit 113 stores, in the limited time storage unit 114, the second limited time period which has been determined by the limited time determination unit 110. Further, the limited time update unit 113 is configured to update the second limited time period stored in the limited time storage unit 114 in match with the second limited time period which has been newly determined by the limited time determination unit 110.

Upon receiving the request of sending the second request signal 42, the second request unit 112A reads out the second limited time period from the limited time storage unit 114. In other words, the second request unit 112A is configured to, once after the limited time storage unit 114 has stored the second limited time period, transmit to the plurality of the terminals 20 via the first communication unit 101 the second request signal 42 including the second limited time information 406 indicative of the second limited time period stored in the limited time storage unit 114.

According to the network system of the modification of the present embodiment, the controller 10A includes the limited time storage unit 114 configured to store the second limited time period determined by the limited time determination unit 110, as the information derived from the number of the first response signals 51 which the first communication unit 101 has received. The second request unit 112A creates the second request signal 42 which includes the second limited time information 406 indicative of the second limited time period stored in the limited time storage unit 114 once after the limited time storage unit 114 has stored the second limited time period.

As described in the above, according to the network system of the modification of the present embodiment, the controller 10A includes the storing means (limited time storage unit 114) configured to store the information (second limited time period) derived from the number of the first response signals 51 which the first communication unit 101 has received. The controller 10A is configured to create the second request signal 42 on the basis of the information (second limited time period) stored in the storing means (limited time storage unit 114) and send the second request signal 42 once after the storing means (limited time storage unit 114) has stored the information (second limited time period).

Accordingly, once after the limited time storage unit 113 has stored the second limited time period, there is no need for determining the second limited time period, and the first request signal 41 need not be sent. Thus, it is unnecessary to send a set of the first and second request signals 41 and 42 every time for the purpose of obtaining the second response signal 52 from the terminal 20. Consequently, it is possible to reduce the communication traffic, and to shorten the transmission processing. Especially, the network system of the present embodiment is suitable for a network system which sees little change in the number of the terminals 20.

The first request signal 41 includes the specific identifier [OID+ITD]. Therefore, only the terminal 20 having the object corresponding to the specific identifier sends the first response signal 51. Thus, the limited time storage unit 114 stores the second limited time, for each class of IID of the object (for each class defined by the specific identifier).

The controller 10A includes the limited time update unit 113. The first request unit 105 is configured to send the first request signal 41 to the plurality of the terminals 20 periodically via the first communication unit 101. The limited time update unit 113 is configured to, when the limited time determination unit 110 determines the second limited time period, update the second limited time period stored in the limited time storage unit 114 with the second limited time period determined by the limited time determination unit 110.

In other words, the controller 10A updates at regular intervals the second limited time period stored in the limited time period storage unit 114. Therefore, the controller is enabled to adapt itself to the change in the configuration (the number of the terminals 20) of the network system. Moreover, the second limited time period can be set to an appropriate time period depending on the number of the terminals 20.

Second Embodiment

Figure 10:
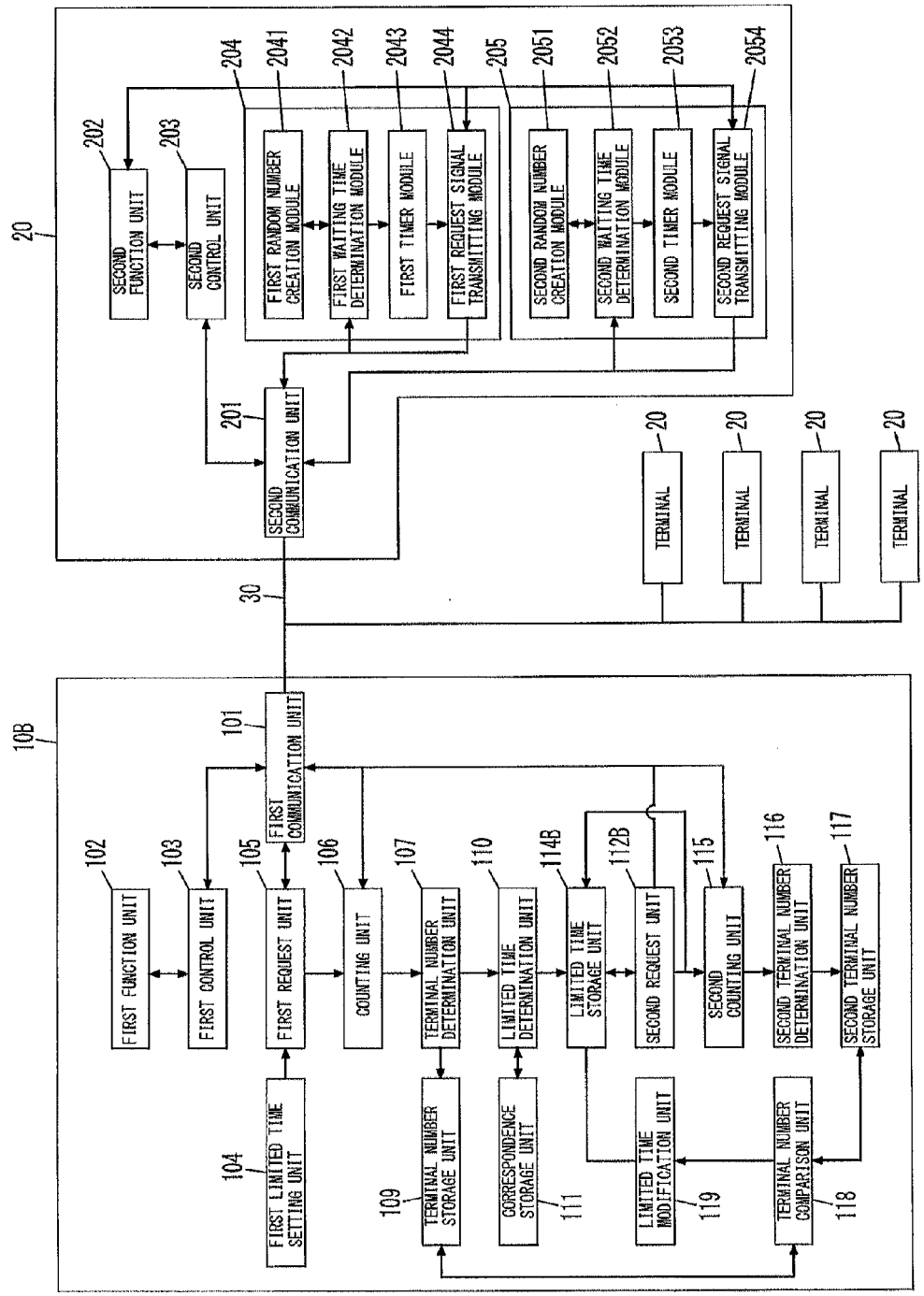
FIG. 10 is a diagram illustrating a configuration of the network system of the second embodiment.

FIG. 10 illustrates the network system of the present embodiment. The network system of the present embodiment includes the controller 10B and the plurality of terminals 20 connected to the controller 10B via the network 30. Components common to the network systems of the first and present embodiments are designated by same reference numerals, and no explanations thereof are deemed necessary.

The controller 10B includes the first communication unit 101, the first function unit 102, and the first control unit 103. The controller 10B further includes the first limited time setting unit 104, the first request unit 105, the counting unit (first counting unit) 106, the terminal number determination unit (first terminal number determination unit) 107, the limited time determination unit 110, the correspondence storage unit 111, the limited time storage unit 114B, and the second request unit 112B. In addition, the controller 10B includes a second counting unit 115, a second terminal number determination unit 116, a second terminal number storage unit 117, a terminal number comparison unit 118, and a limited time modification unit 119.

The limited time storage unit 114B is used for storing the limited time list (see FIG. 11) indicative of the limited time period determined by the limited time determination unit 110. The limited time list indicates a correspondence relation between the specific identifier and the second limited time period determined on the basis of the number of the terminals 20 responding to the first request signal 41 including the corresponding specific identifier. Further, the limited time list stores a fixed flag associated with the specific identifier. The fixed flag indicates "0" or "1". The fixed flag indicative of "0" means that modification of the corresponding second limited time is allowed. The fixed flag indicative of "1" means that the modification of the corresponding second limited time is prohibited.

The second request unit 112B is configured to create the second request signal 42 including the second limited time information 406 indicative of the second limited time stored in the limited time storage unit 114B, once after the limited time storage unit 114B has stored the second limited time period.

The second counting unit 115 is configured to count the second response signals 52 which have been received by the first communication unit 101 within the second limited time period stored in the limited time storage unit 114B. In other words, the second counting unit 115 counts the second response signals 52 received by the first communication unit 101 until the second limited time period elapses from the time at which the first communication unit 101 sends the second request signal 42. After a lapse of the second limited time period, the second counting unit 115 provides the number of the second response signals 52 to the second terminal number determination unit 116.

The second terminal number determination unit 116 is configured to determine the maximum number (total number) of the terminals 20 responding to the controller 10B on the basis of the number of the second response signals 52 obtained from the second counting unit 115. In other words, the second terminal number determination unit 116 determines the maximum number of the terminals 20 which send the second response signal 52 to the controller 10B in response to receiving the second request signal 42. The second terminal number determination unit 116 adopts the number of the second response signals 52 obtained from the second counting unit 115 as the total number of the terminals 20.

The second terminal number storage unit 117 is used for storing the total number of the terminals 20 determined by the second terminal number determination unit 116. The second terminal number storage unit 117 stores a second response number list 1171 as shown in FIG. 12. According to the second response number list 1171 shown in FIG. 12, the numbers of the terminals 20 responding to the second request signals 42 including the object unique identifiers 403 of "*" and the interface identifiers 402 of "1", "2", "3", "4", "5", "6", and "7" are 2, 30, 30, 16, 1, 10, and 2, respectively.

As described in the above, the second response number list 1171 indicates a correspondence relation between the specific identifier (IID of the object, in the instance shown in FIG. 12) of the second request signal 42 and the number of the terminals 20 responding to the second request signal 42 having the corresponding specific identifier.

The terminal number comparison unit 118 is configured to compare the total number (hereinafter, referred to as "first total number", if necessary) of the terminals 20 stored in the terminal number storage unit 109 with the total number (hereinafter, referred to as "second total number", if necessary) of the terminals 20 stored in the second terminal number storage unit 117. The terminal number comparison unit 118 outputs a comparison result of the first and second total numbers to the limited time modification unit 119.

The limited time modification unit 119 is configured to shorten the second limited time period when the comparison result indicates that the second total number is not less than the first total number. This is made on assumption that the adaptive limited time period T20 becomes greater than expected in relation to the number of the terminals 20, when the second total number is not less than the first total number. The limited time modification unit 119 is configured to prolong the second limited time period when the comparison result indicates that the second total number is less than the first total number. This is made on assumption that the adaptive limited time period T20 becomes less than expected in relation to the number of the terminals 20, when the second total number is less than the first total number.

The limited time modification unit 119 can modify only the second limited time period associated with the fixed flag indicative of "0". The limited time modification unit 119 does not modify the second limited time period associated with the fixed flag indicative of "1".

Upon acknowledging that the comparison result of the terminal number comparison unit 118 indicates that the second total number is less than the first total number after the limited time modification unit 119 has shortened the second limited time period stored in the limited time storage unit 114, the limited time modification unit 119 resets the second limited time period to the previous second limited time period. In addition, the limited time modification unit 119 is configured to set the corresponding fixed flag to "1". That is, the limited time modification unit 119 is configured to, upon acknowledgement of that the second limited time period stored in the limited time storage unit 114 is shortened below a predetermined value to an extent that the second total number becomes less than the first total number, fix the second limited time stored in the limited time storage unit 114 to the predetermined period.

Next, an explanation is made to operation of the network system of the present embodiment.

In the controller 10B, upon receiving the request of sending the first request signal 41, the first request unit 105 controls the first communication unit 101 in a manner to send the first request signal 41 to the plurality of the terminals 20. For example, the first request signal 41 includes the operation code 401 of "Watch", the object unique identifier 403 of "*" and the interface identifier 402 of "IID7". Since the maximum number of the terminals 20 allowed to be connected to the network 30 is 100, the first limited time period is defined as a time period within which the controller 10 receives the first response signals 51 respectively sent from all of the hundred terminals 20.

Only the terminal 20 including the interface having the interface identifier "IID7" receives the first request signal 41. In the terminal 20 which has received the first request signal 41, the first waiting time determination module 2042 determines the first waiting time period on the basis of the maximum limited time period T10 indicated by the first limited time information 405 of the first request signal 41. The first response signal transmitting module 2044 sends the first response signal 51 via the second communication unit 201 after a lapse of the first waiting time period determined by the first waiting time determination module 2042.

In the controller 10B, the counting unit 106 counts the first response signals 51 which the first communication unit 101 has received before a lapse of the first limited time period T10. The terminal number determination unit 107 adopts, as the maximum number of the terminals 20, the number of the first response signals 51 obtained from the counting unit 107. The total number (first total number) of the terminals 20 determined by the terminal number determination unit 107 is associated with the specific identifier of the first request signal 41 and is stored in the terminal number storage unit 109 (see FIG. 5).

The limited time determination unit 110 refers to the total number of the terminals 20 stored in the terminal number storage unit 109 and the limited time table 1111 stored in the correspondence storage unit 111, and determines the second limited time period T20. The second limited time period T20 determined by the limited time determination unit 110 is associated with the specific identifier of the first request signal 41 and is stored in the limited time storage unit 114B (see FIG. 11).

Upon receiving the request of sending the second request signal 42, the second request unit 112B obtains the second limited time period T20 corresponding to the specific identifier of the second request signal 42 from the limited time determination unit 114B. The second request unit 112B creates the second request signal 42 including the second limited time information 406 indicative of the obtained second limited time period T20, and sends the second request signal 42 via the first communication unit 101. The second request signal 42 includes the same operation code 401 (="Watch"), object unique identifier 403 (="*"), and interface identifier 402 (="IID7") as those of the first request signal 41.

Like the first request signal 41, the second request signal 42 is received by only the terminal 20 including the interface having the interface identifier "IID7". In the terminal 20 which has received the second request signal 42, the second waiting time determination module 2052 determines the second waiting time period on the basis of the adaptive limited time period T20 indicated by the second limited time information 406 of the second request signal 42. The second response signal transmitting module 2054 sends the second response signal 52 via the second communication unit 201 after a lapse of the second waiting time period determined by the second waiting time determination module 2052.

In the controller 10B, the second counting unit 115 counts the second response signals 52 which the first communication unit 101 has received within the second limited time period T20. The second terminal number determination unit 116 adopts, as the maximum number of the terminals 20, the number of the second response signals 52 obtained from the second counting unit 115. The total number (second total number) of the terminals 20 determined by the second terminal number determination unit 116 is associated with the specific identifier of the second request signal 42 and is stored in the second terminal number storage unit 117 (see FIG. 12).

The terminal number comparison unit 118 compares the first total number with the second total number for each specific identifier.

FIGS. 5 and 12 show that, with respect to the interface identifier "IID5", the second total number (=1) is less than the first total number (=100). In this instance, the limited time modification unit 119 prolongs the second limited time period corresponding to the interface identifier "IID5". For example, the limited time modification unit 119 doubles the second limited time period corresponding to the interface identifier "IID5". Thus, when the second limited time period corresponding to the interface identifier "IID5" is 2 seconds, the second limited time period is changed to 4 seconds.

Further, FIGS. 5 and 12 show that, with respect to the interface identifier "IID2", the second total number (=30) is not less than the first total number (=30). In this instance, the limited time modification unit 119 shortens the second limited time period corresponding to the interface identifier "IID2". For example, the limited time modification unit 119 halves the second limited time period corresponding to the interface identifier "IID2". Thus, when the second limited time period corresponding to the interface identifier "IID2" is 20 seconds, the second limited time period is modified to 10 seconds.

When the second request unit 112 B sends the second request signal 42 next time, the second request unit 112B uses the second limited time period modified by the limited time modification unit 119.

When the second request unit 112B sends the second request signal 42 by use of the second limited time period modified by the limited time modification unit 119, the terminal 20 sends the second response signal 52 in response to this second request signal 42.

The second counting unit 115 counts the second response signals 52 which the first communication unit 101 has received within the second limited time period T20. Consequently, the second total number stored in the second terminal number storage unit 117 is updated.

The terminal number comparison unit 118 compares the first total number with the second total number with respect to the corresponding specific identifier, and notifies the limited time modification unit 119 of the comparison result.

When, as to the same interface identifier (i.e., "IID2"), the second total number is less than the first total number, the limited time modification unit 119 resets the second limited time period to the previous value (=20 seconds) of the second limited time period, and sets the corresponding fixed flag to "1". Consequently, hereafter, the second limited time period corresponding to the interface identifier "IID2" is no longer modified.

According to the network system of the present embodiment as described in the above, the controller 10B further comprises the terminal number storage unit 109, the limited time storage unit 114B, the second counting unit 115, the second terminal number determination unit 116, the second terminal number storage unit 117, the terminal number comparison unit 118, and the limited time modification unit 119. The terminal number storage unit 109 is configured to store the total number of the terminals 20 determined by the terminal number determination unit 107. The limited time storage unit 114B is configured to store the second limited time period determined by the limited time determination unit 110. The second counting unit 115 is configured to count the second response signals 52 which have been received by the first communication unit 101 within the second limited time period stored in the limited time storage unit 114B, and output the number of the second response signals 52. The second terminal number determination unit 116 is configured to determine the total number of the terminals 20 on the basis of the number of the second response signals 52 obtained from the second counting unit 115. The second terminal number storage unit 117 is configured to store the total number of the terminals 20 determined by the second terminal number determination unit 116. The terminal number comparison unit 118 is configured to compare the total number (first total number) of the terminals 20 stored in the terminal number storage unit 109 with the total number (second total number) of the terminals 20 stored in the second terminal number storage unit 117, and output a comparison result. The limited time modification unit 119 is configured to shorten the second limited time period stored in the limited time storage unit 114B when the comparison result indicates that the total number of the terminals 20 stored in the second terminal number storage unit 117 is not less than the total number of the terminals 20 stored in the terminal number storage unit 109. The limited time modification unit 119 is configured to prolong the second limited time period stored in the limited time storage unit 114B when the comparison result indicates that the total number of the terminals 20 stored in the second terminal number storage unit 117 is less than the total number of the terminals 20 stored in the terminal number storage unit 109. The second request unit 112B is configured to send to the plurality of the terminals 20 via the first communication unit 101 the second request signal 52 including the second limited time information 406 indicative of the second limited time period stored in the limited time storage unit 114B.

As described in the above, the network system of the present embodiment shortens the adaptive limited time period T20 when the second total number is not less than the first total number. Accordingly, the adaptive limited time period T20 can be shortened depending on a decrease in the number of terminals 20. Thus, the communication efficiency can be improved. In contrast, the adaptive limited time period T20 is prolonged when the second total number is less than the first total number. Therefore, the controller 10B can successfully receive the response signals respectively sent from the terminals 20.

Further, in the network system of the present embodiment, the limited time modification unit 119 is configured to, upon acknowledging that the comparison result indicates that the second total number is less than the first total number after the limited time modification unit 119 has shortened the second limited time period stored in the limited time storage unit 114B from the predetermined period, fix the second limited time stored in the limited time storage unit 114B to the predetermined period.

Accordingly, the network system of the present embodiment can keep the adaptive limited time period T20 a constant value finally. Therefore, load (processing load) of the controller 10 can be reduced.

Besides, the controller 10B may store the address (first address) of the terminal 20 sending the first response signal 51 in response to the first request signal 41 and the address (second address) of the terminal 20 sending the second response signal 52 in response to the second request signal 42. In this modification, the controller 10B verifies the first address with the second address, thereby identifying the terminal 20 which has responded to the first request signal 41 but has not responded to the second request signal 42. The controller 10B sends the request signal to the identified terminal 20 in a unicast manner. In this instance, the controller 10B can successfully receive the response signal sent in response to the multicast request signal, even if the limited time is not appropriate to the transport of the network 30.

Besides, the network system of the first or second embodiments may include a plurality of the controllers 10, 10A, or 10B. Further, the controller 10, 10A, or 10B may broadcast the request signal.

The invention claimed is:

1. A network system comprising:
a controller; and
a plurality of terminals connected to said controller via a network,
wherein
said controller comprises a first communication unit configured to communicate with said terminals via the network, a first request unit, a counting unit, a terminal number determination unit, a limited time determination unit, and a second request unit,
each of said terminals comprising a second communication unit configured to communicate with said controller via the network, a first response unit, and a second response unit,
said first request unit being configured to send a first request signal to the plurality of said terminals via said first communication unit, the first request signal including first limited time information indicative of a first limited time period,
the first limited time period being defined to be a predetermined range within which said first communication unit receives signals respectively from all of a maximum number of said terminals allowed to be connected to the network,
said first response unit being configured to, in response to receiving the first request signal via said second communication unit, send a first response signal to said controller via said second communication unit before a lapse of the first limited time period indicated by the first limited information included in the first request signal,
said counting unit being configured to count the first response signals which have been received by said first communication unit within the first limited time period, and output the number of the first response signals,
said terminal number determination unit being configured to determine a total number of said terminals on the basis of the number of the first response signals obtained from said counting unit,
said limited time determination unit being configured to determine a second limited time period being defined to be a range within which said first communication unit receives signals from all of the total number of said terminals determined by said terminal number determination unit,
said second request unit being configured to send a second request signal to the plurality of said terminals via said first communication unit, the second request signal including second limited time information indicative of the second limited time period determined by said limited time determination unit, and said second response unit being configured to, in response to receiving the second request signal via said second communication unit, send a second response signal to said controller via said second communication unit before a lapse of the second limited time period indicated by the second limited information included in the second request signal.

2. The network system as set forth in claim 1, wherein said controller further comprises a storing means configured to store information derived from the number of the first response signals, said controller being configured to use the information stored in said storing means to create the second request signal and send the created second request signal.

3. The network system as set forth in claim 2, wherein said storing means is defined as a terminal number storage unit configured to store the total number of said terminals determined by said terminal number determination unit as the information derived from the number of the first response signals, said limited time determination unit being configured to determine the second limited time period by use of the total number of said terminals stored in said terminal number storage unit.

4. The network system as set forth in claim 2, wherein said storing means is defined as a limited time storage unit configured to store the second limited time period determined by said limited time determination unit as the information derived from the number of the first response signals, said second request unit being configured to create the second request signal which includes the second limited time information indicative of the second limited time period stored in said limited time storage unit.

5. The network system as set forth in claim 3, wherein said controller further comprises a terminal number update unit, said first request unit being configured to control said first communication unit in a manner to send the first request signal to the plurality of said terminals periodically, and said terminal number update unit being configured to, when said terminal number destination unit newly determines the total number of said terminals, update the total number of said terminals stored in said terminal number storage unit in match with the total number of said terminals newly determined by said terminal number determination unit.

6. The network system as set forth in claim 4, wherein said controller further comprises a limited time update unit, said first request unit being configured to control said first communication unit in a manner to send the first request signal to the plurality of said terminals periodically, and said limited time update unit being configured to, when said limited time determination unit newly determines the second limited time period, update the second limited time period stored in said limited time storage unit in match with the second limited time period newly determined by said limited time determination unit.

7. The network system as set forth in claim 1, wherein said first response unit includes a first waiting time determination module, and a first response signal transmitting module, said first waiting time determination module being configured to select a first waiting time period in a random manner from time periods not greater than the first limited time period indicated by the first limited time information included in the first request signal received by said second communication unit, said first response signal transmitting module being configured to send the first response signal to said controller via said second communication unit after a lapse of the first waiting time period, said second response unit including a second waiting time determination module, and a second response signal transmitting module, said second waiting time determination unit being configured to select a second waiting time period in a random manner from time periods not greater than the second limited time period indicated by the second limited time information included in the second request signal received by said second communication unit, and said second response signal transmitting module being configured to send the second response signal to said controller via said second communication unit after a lapse of the second waiting time period.

8. The network system as set forth in claim 1, wherein said controller further comprises a correspondence storage unit, said correspondence storage unit being configured to store a correspondence relation between the total number of said terminals and the second limited time period, and said limited time determination unit being configured to refer to the correspondence relation stored in said correspondence storage unit, and select the second limited time period corresponding to the total number of said terminals determined by said terminal number determination unit.

9. The network system as set forth in claim 1, wherein said controller further comprises a terminal number storage unit, a limited time storage unit, a second counting unit, a second terminal number determination unit, a second terminal number storage unit, a terminal number comparison unit, and a limited time modification unit, said terminal number storage unit being configured to store the total number of said terminals determined by said terminal number determination unit, said limited time storage unit being configured to store the second limited time period determined by said limited time determination unit, said second counting unit being configured to count the second response signals which have been received by said first communication unit within the second limited time period stored in said limited time storage unit, and output the number of the second response signals, said second terminal number determination unit being configured to determine the total number of said terminals on the basis of the number of the second response signals obtained from said second counting unit, said second terminal number storage unit being configured to store the total number of said terminals determined by said second terminal number determination unit, said terminal number comparison unit being configured to compare the total number of said terminals stored in said terminal number storage unit with the total number of said terminals stored in said second terminal number storage unit, and output a comparison result, said limited time modification unit being configured to shorten the second limited time period stored in said limited time storage unit when the comparison result indicates that the total number of said terminals stored in said second terminal number storage unit is not less than the total number of said terminals stored in said terminal number storage unit, said limited time modification unit being configured to prolong the second limited time period stored in said limited time storage unit when the comparison result indicates that the total number of said terminals stored in said second terminal number storage unit is less than the total number of said terminals stored in said terminal number storage unit, and said second request unit being configured to send to the plurality of said terminals via said first communication unit the second request signal including the second limited time information indicative of the second limited time period stored in said limited time storage unit.

10. The network system as set forth in claim 9, wherein said limited time modification unit is configured to, upon acknowledging that the comparison result indicates that the total number of said terminals stored in said second terminal number storage unit is less than the total number of said terminals stored in said terminal number storage unit once after said limited time modification unit shortens the second limited time period stored in said limited time storage unit from a predetermined period, fix the second limited time stored in said limited time storage unit to the predetermined period.

* * * * *